United States Patent Office 2,968,999
Patented Jan. 24, 1961

2,968,999
PROCESS FOR CUTTING METAL EMPLOYING AMORPHOUS SILICA

Ernest J. Breton, West Grove, Pa.

No Drawing. Filed Dec. 31, 1957, Ser. No. 706,259

4 Claims. (Cl. 90—11)

This invention is directed to colloidal silica dispersed in fluent carriers used as metal working fluids.

In metal cutting and machining, the metal deformation and heavy rubbing pressures that develop between adjacent surfaces of tool and work material results in the development of high temperatures. It is necessary to control the temperatures between the metal surfaces to prevent adherence or welding between surfaces and to minimize changes in metal properties. Such control is usually obtained through the use of fluids used as coolants and lubricants. Also, cutting speed, tool life, power consumption, surface finish, well-broken chips, freedom from corrosion and and important like factors are greatly influenced by the cutting fluid used between adjacent surfaces of tool work material.

It has now been unexpectedly discovered that dispersions of colloidal silica in fluent carriers make excellent metal cutting and machining fluids. Such fluids not only greatly reduce the amount of heat generated between metal surfaces being worked but also provide in many instances improved appearance of the final work. The fluent carrier is aqueous or non-aqueous and can be an emulsion. The silica, the fluent carriers, and the dispersions will now be more particularly described, and a general description of the use of these dispersions will be given.

THE SILICA

In general, any silica can be used so long as it is capable of forming colloidal dispersion in a fluent carrier and has an average particle diameter when dispersed below about 150 millimicrons. The particles themselves either can be substantially pure silicon dioxide, or they can be modified by the presence of other materials chemically bound to or adsorbed upon the surfaces of the particles. The particles can be discrete or agglomerated.

Some types of substantially pure silicon dioxide particles can be readily dispersed in both organic and inorganic fluids. Thus, fumed silicas like "Cab-O-Sil," a submicroscopic particulate very pure silica prepared in a hot gaseous environment by the vapor-phase hydrolysis of a silicon compound, can be dispersed in a fluent carrier.

Unmodified, substantially pure silicon dioxide particles can be most readily dispersed in aqueous media. To promote dispersions of silica particles in organic media, the silicon dioxide particles can be treated with other materials. Thus, the particles can be surface-esterified or have chemicals adsorbed upon their surfaces.

When surface-esterified, discrete silicon dioxide particles are used, the particles are dispersed in organic liquid media as true organosols. The surface-esterified particles will range in size from about 5 to 150 millimicrons in diameter. The surfaces of the particles are coated with monohydric alcohol radicals containing up to about 18 carbon atoms per radical. In each radical the carbon atom attached to the alcohol oxygen is also attached to at least one hydrogen.

Instead of being surface-esterified, the silica particles can have absorbed upon their surfaces a long chain substituted quaternary ammonium ion.

The preparation of such silica particles are particularly described in Iler Patent No. 2,692,863. Such colloidal particles form true organosols and their average size ranges from about 5 to about 150 millimicrons in diameter.

The preferred silica particles are those which form true aquasols and organosols in water, organic or emulsified fluids. Most preferred silicas are those which form stable aquasols when colloidally dispersed in an aqueous fluent carrier. By "stable" is meant that the sols are stable for periods of time in excess of one year. The preferred types of particles can be prepared according to the methods described in Bechtold and Snyder Patent No. 2,754,902, Rule Patent No. 2,577,485 and Alexander Patent No. 2,750,345.

THE FLUENT CARRIERS

The fluent carriers used can be divided into the following classes: (1) water, (2) organic liquids, and (3) emulsions.

When water is used, corrosion inhibitors can be added such as sodium nitrate, sodium nitrite, sodium benzoate and sodium dichromate. In addition, corrosion can be minimized by raising the pH of the system by adding, for example, aqueous alkali metal hydroxides such as solutions containing sodium hydroxide, potassium hydroxide and the like.

The organic liquid used can be water-miscible or water-immiscible. The choice of liquid will be determined by a number of conditions such as cost, safety and cutting or machine operating conditions. Because oils are readily available and have lubricating qualities, they will be customarily employed. Oils such as mineral, fixed, compounded, sulfurized, chlorinated or sulfur-chlorinated oils can be used. Any animal, vegetable or synthetic oil can also be used.

The petroleum hydrocarbon oils are, of course, conventional lubricants and are extensively used in cutting and machining fluids. Typical oils are: kerosene and straight petroleums and mixtures with low percentages of fatty or other bases. Particularly useful oils are sulfurized or sulfur-bearing oils. These oils can contain as much as 2% active sulfur. Mixtures of petroleum and fatty oils can also be used. Suitable non-petroleum oils include rapeseed oil, cottonseed oil and linseed oil.

When emulsions are used they will customarily be composed of water, oil and an emulsifying agent. The concentration of the emulsion as regards the amount of oil or water present is usually determined either by the requirements for preventing rust on the metal being machined or on the requirements for lubricating the machine and usually not by the actual machine operation. The emulsifier used in oil-water emulsions should be capable of holding the oil in the aquasol or the water in the organosol together in an apparently homogenous system. By "apparently" is meant that the emulsion components do not separate out one from the other while the composition is being pumped over the tool point and work being machined. The emulsifier must be compatible with the silica used. It must not cause precipitation or gelation. Freedom from gelation can be determined by a simple test consisting of adding an emulsifier to a sol or dispersion containing silica. If the amount of emulsifier which must be used for emulsification exceeds the amount which can safely be used without causing precipitation or gelation, then this emulsifier cannot be used.

Typical emulsifiers which can be used are indicated in the following Table I:

*Table I*

| Chemical Constitution | Trade Name | Ion Type |
|---|---|---|
| Diethanolamine condensate | Alrosol B | non- |
| Reaction product of coconut oil fatty acid amide with 5 moles ethylene oxide. | Ethomid C/15 | non- |
| Reaction product of fatty acid amide from hydrogenerated tallow and ethylene oxide. | Ethomid HT/15 | non- |
| Sodium salt of sulfoester of a fatty alkanolamide. | Oratol L 48 | an- |
| Coconut oil amine condensate | Ultrapole S | non- |
| Fatty acid alkanolamide | Eccanol A | non- |
| Polyethylene Glycol ester of fatty acids | Acco Emulsifier | non- |
| Alkyl aryl polyether alcohol | Agrimul 70-A | non- |
| Polyoxyethylene Sorbitan monooleate | Atlox 81 | non- |
| Glycol amido stearate | Cerasynt IP | non- |
| Polyoxyethylene glycol esters of coconut fatty acids. | Ethofat C-15 | non- |
| Polyoxyethylene glycol esters of rosin acids. | Ethofat 142-15 | non- |
| Aromatic polyglycol ether | Neutronyx 600 | non- |
| Mixed fatty acid (C-10 to C-16) akylol amine condensate. | Ninol 737 | non- |
| Glycerol mannitan laurate | NNO | non- |
| Polyoxyethylene sorbitan monolaurate | Tween 21 | non- |
| Diethylene glycol oleate | Witco DGO | non- |
| Glycerol Monooleate | Witco GMO | non- |

THE METAL CUTTING AND MACHINING FLUIDS

The compositions used in the methods of this invention comprise colloidal silica dispersed in a fluent carrier. The silica and the fluent carrier have been separately described above. In general, the fluids should be freely pumpable over the tool point and material being worked. The agitation of the pump as respects the cutting fluid should be sufficient to maintain the dispersed silica in the fluent carrier.

The silica concentration in the machining and cutting fluids can vary from as low as 0.01% to more than 60% by weight in the fluid compositions. For commercial reasons it is sometimes preferred to use cutting fluids containing a silica concentration of from about 0.5% to 30% by weight. The concentration of silica in the compositions is influenced by the particle size of the silica. In general, the greater the particle size, the higher the concentration of silica that can be present before gelation of the fluids occurs to an extent greater than that permissible in order to make the compositions pumpable.

These machining and cutting fluids can be prepared in the form of concentrates for dilution by the user. For example, concentrates can be prepared for dilution with an oil of a special type or with water so as to make cutting oils particularly useful for specific machining and cutting operations. When emulsions are used it is preferred to make the continuous phase aqueous.

These cutting fluids can be used for all cutting and machining operations including latheing, broaching, shaping, grinding, threading, tapping, stamping, pressing, boring, turning, drilling, milling, cutting, hobbing, and the like. Similarly, these fluids can be used on all machinable materials including ferrous metals and their alloys, non-ferrous metals and their alloys, and machinable plastics.

Those skilled in the art know how to prepare cutting fluids for application to various specific processes involving different operations and materials. The preparation of cutting and machining fluids for special operating conditions forms no part of the present invention. A discussion of the preparation of these specialized fluids appears in Tool Engineers Handbook published by McGraw-Hill Book Company, Inc. (1949), at pages 357 through 366, and in Metals Handbook (1948 and yearly supplements thereafter) published by the American Society for Metals, pages 66 through 70.

Particularly useful cutting fluids have been found to be silica aquasols and silica organosols. Of these two, the silica aquasols have been found to be particularly useful. Silica aquasols that are especially useful are described, for instance, in Bechtold and Snyder Patent No. 2,754,902, Rule U.S. Patent No. 2,577,485 and Alexander U.S. Patent No. 2,750,345. All sols produced by the methods disclosed in these patents are characterized by being alkali stabilized and containing a $SiO_3:Na_2O$ weight ratio in the preferred class of sols of from about 60:1 to 500:1. Specifically, sols of the above-mentioned Bechtold and Snyder patent having a $SiO_2:Na_2O$ weight ratio of about 90:1, having substantially discrete particles of amorphous silica about 17 millimicrons in diameter and having a relative viscosity in the range of from about 1.15 to 1.55 as measured at 10% $SiO_3$ and pH 10, are particularly effective.

Wetting agents are sometimes added to both organosols and aquasols to promote wetting of the surface of the materials in order to bring the cutting fluids into rapid, intimate contact with the metal surface. These wetting agents are used in addition to the emulsifiers in the case of emulsions.

Particularly effective as wetting agents in the compositions of this invention are those selected from the group consisting of dioctyl ester of sodium sulfosuccinate and trimethyl nonyl ether of polyethyleneglycol. Of these, the former has given particularly excellent results.

Other wetting agents which can be used are:

*Table II*

| Chemical Constitution | Trade Name | Ion Type |
|---|---|---|
| Diamyl ester of sodium sulfosuccinic acid | Aerosol AY | an- |
| Dihexyl ester of sodium sulfosuccinic acid | Aerosol MA | an- |
| N-octa decyldisodium sulfosuccinamate | Aerosol 18 | an- |
| Bis(p-tert.-butyl phenoxyethyl) sodium succinate. | Surface active agent BPETR. | an- |
| Alkyl polyoxyethylene amide | Antarox G-100 | non- |
| Polyoxethylene lauryl ether | Brij 30 | non- |
| Polyoxyethylated fatty alcohol | Diazapon AN | non- |
| Alkyl aryl polyoxyethylene | Druterge ON | non- |
| Polyoxyethylene alkyl phenol | Energetic W-100 | non- |
| Nonyl phenoxy polyoxyethylene ethanol | Igepal CO-430 | non- |
| Sodium N-methyl-N oleoyl taurate | Igepon T-33 | an- |
| Polyoxyethylene tridecyl alcohol | Renex 30 | non- |
| Polyoxyethylene thio ether | Sterox SE | non- |
| Alkyl phenyl polyethylene glycol ether | Tergitol NP 27 | non- |
| Polyalkalene glycol ether | Tergitol XD | non- |

The invention is further illustrated by the following additional examples:

EXAMPLE 1.—DEEP CUTTING

A. A standard lip-type tool containing 18% tungsten, 4% chromium and 2% vanadium and manufactured under the trademark EVM by the Vanadium Alloy Steel Co. is used to machine 316 stainless steel in a 14″ Monarch Lathe. The feed is 0.007 inch per revolution, the cut is ⅜ inch, and the surface speed is 92 inches per minute.

The cutting liquid used is made by diluting "Ludox" colloidal silica HS to a silica content of ½% $SiO_2$. "Ludox" is Du Pont's registered trademark for its colloidal silica squasols prepared according to the teachings of the Bechtold and Snyder patent above referred to.

Inspection of the surface of the machined product indicates that the machined surfaces are of excellent quality. The chips produced, using ½% silica aquasol, were much cooler than those obtained using conventional liquids.

Using the same apparatus and metal, the cut is repeated using concentrated silica aquasol containing 30% silica and sold under the trademark "Ludox" colloidal silica HS. Machined surfaces are of excellent quality.

Using the same apparatus and methods and also the same cutting fluids, other metals are similarly cut. Results obtained are comparable to those obtained using 316 stainless steel. The chips are much cooler than those produced using conventional cutting fluids. Such other metals are: 4/10 stainless steel, 202 stainless steel, phosphorous bronze, silica bronze, admiralty metal, 24–S aluminum, 75–S aluminum, titanium-8-manganese, titanium-6-aluminum-4-vanadium and malleable iron.

B. Using the same apparatus and metal, the following cutting fluid is used:

An organosol of ethyl cellulose esterified silica in ethyl "Cellosolve" containing 10% silica is prepared by de-ionizing "Ludox" colloidal silica HS, a colloidal 30% silica aquasol prepared according to the cited Bechtold and Snyder Patent, with cation and anion exchange resins, mixing the resulting sol with ethyl "Cellosolve" and distilling off the water. When this cutting fluid is used to machine 316 stainless steel, inspection of the surface of the machined product indicates the machined surfaces have excellent quality. Chips obtained are much cooler than those obtained using conventional cutting fluids.

C. Using the same apparatus and metal, the following cutting fluid is used: An organosol of ethylene glycol containing ethylene glycol esterified silica in ethylene glycol and water.

This organosol is prepared as described under "B" above. In this example, the sol was diluted with water. The composition of the sol used here contains 5.0% silica, 11.7% ethylene glycol and 83.3% water.

Inspection of the surface of the machined 316 stainless steel product indicates machined surfaces of excellent quality. The chips obtained during machining are much cooler than those obtained using conventional cutting fluids.

EXAMPLE 2

A. Employing 316 stainless steel, a silica aquasol containing ½% $SiO_2$ prepared from "Ludox" colloidal silica, as described in Example I, is pumped over the metal during milling using a No. 12 Van Norman Milling Machine. Use of the silica sol (½% $SiO_2$) greatly facilitates this operation and the appearance of the final product is excellent. The chips produced during the milling are cool and the cut surfaces are clean without serrations indicating efficient cutting fluid action.

Using the same apparatus and grade of stainless steel, the operation is repeated using a concentrated 30% full strength "Ludox" colloidal silica aquasol. Appearance of the work is excellent.

B. Using the same apparatus and metal, the following cutting fluid is used: an emulsion prepared by mixing five parts of diethylene glycol laurate emulsifying agent with twenty-five parts SAE–20 lubricating oil. To this mixture are slowly added, with agitation, seventy parts of 30% colloidal silica aquasol sold under the trademark "Ludox" colloidal silica LS.

Inspection of the surface of the machined product indicates the machined surfaces have excellent quality. The chips produced are much cooler than those obtained using conventional cutting fluids.

C. Using the same apparatus and metal, the following cutting fluid is used:

An emulsion prepared by adding four parts of diethanolamine amide emulsifying agent to 30 parts of a toluene-silica organosol containing 45% colloidal silica and to this adding one thousand parts of a 50–50 mixture of water and toluene slowly with agitation. Toluene-silica organosols are described in U.S. Patent No. 2,692,863. The machined surfaces are of excellent quality on the machined product. The chips produced are much cooler than those obtained using conventional cutting fluids.

EXAMPLE 3.—DRILLING

A. 2S aluminum plate is drilled with a 5/32" drill and a ¾" drill, both rotating at 1000 r.p.m. using ½" Walker-Turner radial drill press. A 1% colloidal silica aquasol prepared by diluting "Ludox" colloidal silica HS with water, as described in Example 1, is pumped over the metal during cutting. The drilling operation is greatly facilitated by the use of this sol and the metal turnings produced show no serrations.

In the same manner, a 17% silica aquasol prepared by diluting "Ludox" colloidal silica HS with water as done in Example 1 and also a 30% "Ludox" colloidal silica LS aquasol are used and equivalent results are obtained on the 2S aluminum plate.

Using the same equipment, copper is drilled with a 2% colloidal silica prepared by diluting "Ludox" colloidal silica HS with water. Cooling is greatly improved and the turnings are smooth.

B. Using the same apparatus, a ¾" drill, and 2S aluminum plate, drilling is carried out using the following cutting fluid: A composition containing 85% "Ludox" colloidal silica LS aquasol containing 30% silica and 15% glycerine. The machined surfaces of the aluminum are of excellent quality.

C. Using a ¾" drill and the same drill press, 2S aluminum is drilled using the following cutting fluid: an emulsion containing three parts sodium lauryl sulfonate, 15 parts SAE–20 petroleum paraffin-base oil, and 82 parts of "Ludox" colloidal silica LS aquasol containing 30% colloidal silica is prepared by adding the sodium lauryl sulfonate to the coil and then adding the "Ludox" to this resulting mixture slowly with agitation. This was then diluted with water so that the mix contained 1% silica. Machined surfaces are of excellent quality and turnings are much cooler than those obtained using conventional fluids.

D. Using a ¾" drill and the same drill press, 2S aluminum plate is drilled using the following cutting fluid: An emulsion containing 7 parts of a sulfonated oil emulsifier, 10 parts of light paraffinic petroleum oil and 83 parts of "Ludox" colloidal silica aquasol HS containing 30% colloidal silica. This composition is prepared by admixing the emulsifier which in this case is the sulfonated oil with the oil and then slowly adding the silica aquasol to this resulting mixture. This composition is then diluted with water to contain 2% colloidal silica.

The machined surfaces, using this emulsion are of excellent quality and the turnings are much cooler than those obtained using conventional cutting fluids.

EXAMPLE 4.—LATHE OPERATION

"Ludox" colloidal silica aquasol containing 30% colloidal silica is diluted with water to contain about ½% silica. When this composition is used to machine some ½" 2S aluminum rod on a lathe it is noted that the aluminum is unusually easy to machine compared with conventional cutting fluids and also that the machined product has a very good appearance. The chips produced are much cooler than those obtained using conventional cutting fluids.

EXAMPLE 5.—SHAPING

"Ludox" colloidal silica aquasol containing 30% colloidal silica is diluted with water so as to contain 1% silica. When this composition is pumped over the metal in a shaping operation on 316 stainless steel using a Gould and Eberhardt 16" shaper and a 3/8" square tool bit, it is noted that the steel is very easy to machine and that the machined product has a good appearance. The chips produced are much cooler than those obtained using conventional cutting fluids.

The embodiments of the invention in which an exclusive property or privilege is claimed are as follows:

1. In a process for cutting metal with a tool point the improvement which consists of cooling the tool point during the cutting operation by flowing upon it a liquid in which there is colloidally dispersed about from 0.5% to 30% by weight of amorphous silica in the form of substantially discrete particles up to 150 millimicrons in size.

2. A process of claim 1 in which the liquid coolant is a silica aquasol.

3. A process of claim 1 in which the liquid coolant is a silica organosol.

4. A process of claim 1 in which the silica is dispersed in an oil-in-water emulsion.

References Cited in the file of this patent

UNITED STATES PATENTS

| | | |
|---|---|---|
| 2,112,632 | Montgomery | Mar. 29, 1938 |
| 2,433,779 | Marshall | Dec. 30, 1947 |
| 2,577,485 | Rule | Dec. 4, 1951 |
| 2,692,863 | Iler | Oct. 26, 1954 |
| 2,750,345 | Alexander | June 12, 1956 |
| 2,818,386 | Francis et al. | Dec. 31, 1957 |
| 2,828,261 | Milberger et al. | Mar. 25, 1958 |
| 2,829,430 | Toulmin | Apr. 8, 1958 |
| 2,891,010 | Martinek | June 16, 1959 |